US012706043B2

(12) United States Patent
Choi et al.

(10) Patent No.: US 12,706,043 B2
(45) Date of Patent: Aug. 11, 2026

(54) FREQUENCY VARIABLE DISPLAY APPARATUS AND FLICKER COMPENSATION METHOD THEREOF

(71) Applicant: LG Display Co., Ltd., Seoul (KR)

(72) Inventors: Seok Min Choi, Paju-si (KR); Moo Kyoung Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/982,742

(22) Filed: Dec. 16, 2024

(65) Prior Publication Data

US 2025/0265992 A1 Aug. 21, 2025

(30) Foreign Application Priority Data

Feb. 16, 2024 (KR) ........................ 10-2024-0022269

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/0233* (2013.01); *G09G 2320/0247* (2013.01); *G09G 2340/0435* (2013.01)

(58) Field of Classification Search
CPC ......... G09G 3/3233; G09G 2300/0842; G09G 2310/08; G09G 2320/0233; G09G 2320/0247; G09G 2340/0435; G09G 3/3208; G09G 2310/027
See application file for complete search history.

(56) References Cited

U.S. PATENT DOCUMENTS 9,823,729 B2 * 11/2017 An ........................ G09G 3/3233
2013/0127692 A1 * 5/2013 Yoon .................... G09G 3/3258 345/80
2016/0189617 A1 * 6/2016 Park ......................... G09G 5/10 345/690
2018/0053462 A1 * 2/2018 Bae ...................... G09G 3/2074
2019/0378459 A1 * 12/2019 Kim ..................... G09G 3/3291
2020/0226978 A1 * 7/2020 Lin .................... H10K 59/1213
2022/0036812 A1 * 2/2022 Noh ......................... G09G 3/32
2022/0068194 A1 * 3/2022 Kim ......................... G09G 3/32
2022/0084472 A1 * 3/2022 Kim ..................... G09G 3/3266
2022/0122550 A1 * 4/2022 Ha ....................... G09G 3/3291
2022/0157263 A1 * 5/2022 Moon .................. G09G 3/3233
2022/0199025 A1 * 6/2022 Hong .................. G09G 3/3258
2022/0262295 A1 * 8/2022 Kim ..................... G09G 3/2007
(Continued)

FOREIGN PATENT DOCUMENTS

KR 10-2023-0064482 A 5/2023

*Primary Examiner* — Jeff Piziali
(74) *Attorney, Agent, or Firm* — Birch, Stewart, Kolasch & Birch, LLP

(57) ABSTRACT

A frequency variable display apparatus can include a display panel including a plurality of subpixels, an image driving circuit configured to write, in each of the plurality of subpixels, a data voltage through a data line and a reference voltage through a reference voltage line during a vertical active period of one frame to implement active luminance, and a flicker compensation circuit configured to apply a compensation voltage to at least one of the data line and the reference voltage line in a vertical blank period of the one frame to implement blank luminance. The blank luminance is lower than the active luminance.

16 Claims, 14 Drawing Sheets

(56) References Cited

U.S. PATENT DOCUMENTS

| | | | | |
|---|---|---|---|---|
| 2022/0375400 | A1* | 11/2022 | Kim | G09G 5/391 |
| 2022/0406252 | A1* | 12/2022 | Feng | G09G 3/3233 |
| 2022/0406259 | A1* | 12/2022 | Lee | G09G 3/3275 |

* cited by examiner

FREQUENCY VARIABLE DISPLAY APPARATUS AND FLICKER COMPENSATION METHOD THEREOF

CROSS-REFERENCE TO RELATED APPLICATIONS

This application claims priority to Korean Patent Application No. 10-2024-0022269 filed in the Republic of Korea, on Feb. 16, 2024, the entirety of which is hereby incorporated by reference into the present application as if fully set forth herein.

BACKGROUND

Field

The present disclosure relates to a frequency variable display apparatus and a flicker compensation method thereof.

Discussion of the Related Art

Frequency variable display apparatuses vary a frame frequency of an image displayed on a screen, based on an attribute of video data received from an external video source. Frequency variable display apparatuses support a variable refresh rate (VRR) function which varies a frame frequency within a predetermined frequency range.

When a frame frequency is rapidly changed from a low-speed frame to a high-speed frame or vice versa by a VRR operation, a flicker phenomenon caused by a recognition luminance deviation may be recognized by a user. To decrease the recognition luminance deviation, luminance algorithm technology which adjusts a data gain with a frame frequency can be used.

However, in a VRR mode, frequency information about a current frame may not be known until the current frame ends. Therefore, conventional luminance algorithm technology determines a data gain of a current frame, based on frequency information about a previous frame, and due to this, it is difficult to decrease a recognition luminance deviation between a first frame immediately after a frame frequency is rapidly changed and a frame immediately before the first frame.

Thus, a need exists for a display device having a configuration that can prevent a noticeable flicker or luminance deviation from being perceptible by a user when changing a driving frequency of the display device.

SUMMARY OF THE DISCLOSURE

To overcome the aforementioned problem of the related art, the present disclosure can provide a frequency variable display apparatus and a flicker compensation method thereof, which can decrease a recognition luminance deviation occurring in a rapid change condition of a frame frequency.

To achieve these objects and other advantages and in accordance with the purpose of the disclosure, as embodied and broadly described herein, a frequency variable display apparatus includes a display panel where a plurality of subpixels are provided, an image driving circuit configured to write, in each of the plurality of subpixels, a data voltage through a data line and a reference voltage through a reference voltage line in a vertical active period of one frame to implement active luminance, and a flicker compensation circuit configured to apply a compensation voltage to at least one of the data line and the reference voltage line in a vertical blank period of the one frame to implement blank luminance which is lower than the active luminance.

In another aspect of the present disclosure, a flicker compensation method of a frequency variable display apparatus, including a display panel where a plurality of subpixels are provided, includes writing, in each of the plurality of subpixels, a data voltage through a data line and a reference voltage through a reference voltage line in a vertical active period of one frame to implement active luminance and applying a compensation voltage to at least one of the data line and the reference voltage line in a vertical blank period of the one frame to implement blank luminance which is lower than the active luminance.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
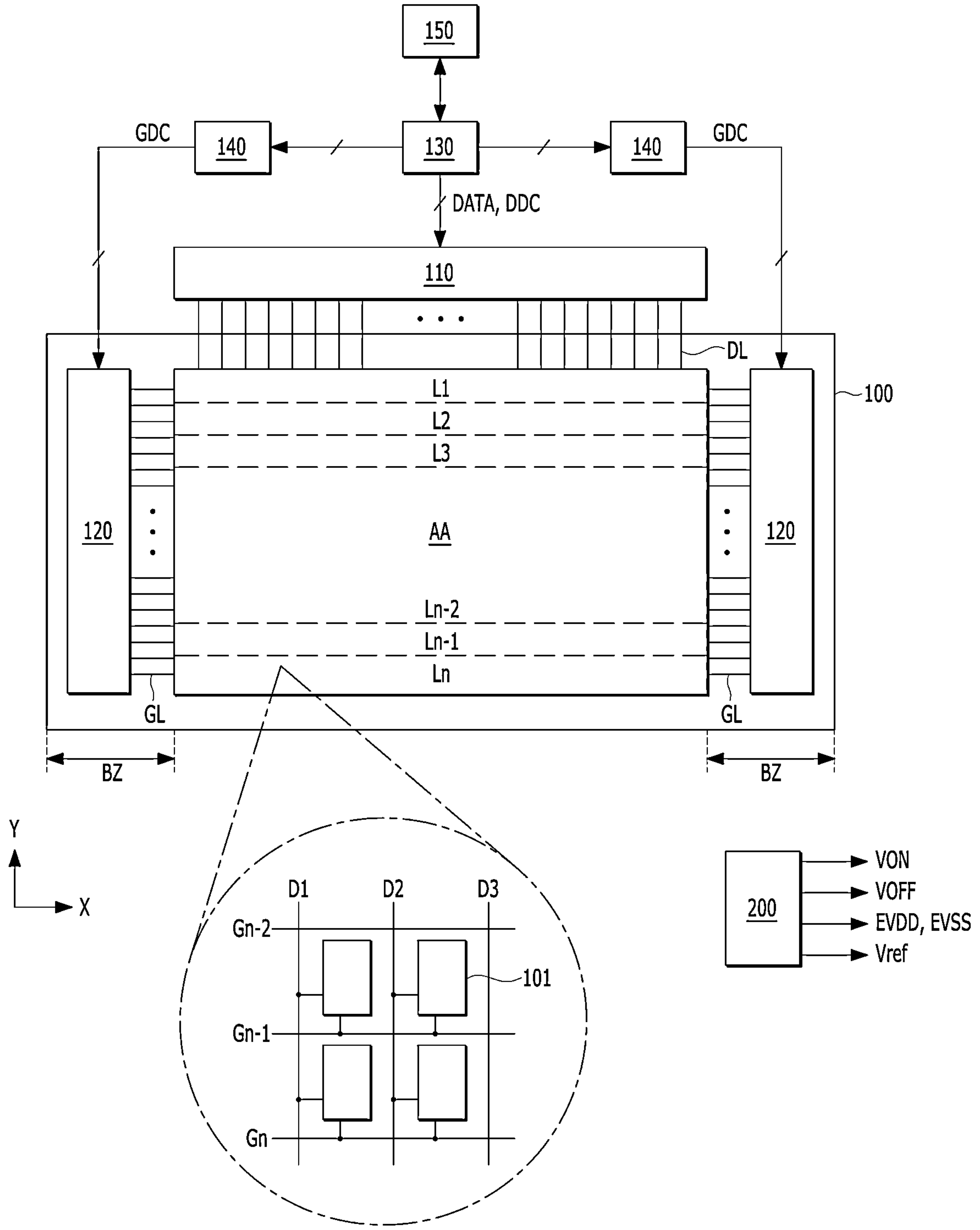
FIG. 1 is a block diagram illustrating a frequency variable display apparatus according to an embodiment of the present disclosure.

Hereinafter, the present disclosure will be described more fully with reference to the accompanying drawings, in which example embodiments of the disclosure are shown. The disclosure can, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on," "over," "under," and "next," one or more other parts can be disposed between the two parts unless "just" or "direct" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. Also, the term "can" includes all meanings and definitions of the word "may."

The following embodiments can be partially or entirely bonded to or combined with each other and can be linked and operated in technically various ways. The embodiments can be carried out independently of or in association with each other.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating a frequency variable display apparatus according to an embodiment of the present disclosure.

Referring to FIG. 1, a display panel 100 can include a screen AA which displays an input image. The screen AA can include a pixel array which displays pixel data (hereinafter referred to as "image data") DATA of an input image. The pixel array can include a plurality of data lines DL, a plurality of gate lines GL intersecting with the data lines DL, a plurality of reference voltage lines, and a plurality of pixels.

The pixels can be arranged on the screen AA in a matrix type defined by the data lines DL, the gate lines GL, and the reference voltage lines. The pixels can be arranged as various types, such as a stripe type and a diamond type as well as a matrix type, on the screen AA.

The pixel array can include a plurality of pixel columns and a plurality of pixel lines L1 to Ln intersecting with the pixel columns. Each of the pixel columns can include pixels which are arranged in a Y-axis direction. A pixel line can include pixels which are arranged in an X-axis direction. One vertical period can be one frame period needed for writing image data DATA of one frame in all pixels of the screen. One horizontal period can be a time obtained by dividing one frame period by the number of pixel lines L1 to Ln. One horizontal period can be a time needed for writing the image data DATA of one pixel line, sharing a gate line GL, in pixels of one pixel line.

Each of the pixels can include a red (R) subpixel 101, a green (G) subpixel 101, a blue (B) subpixel 101, and a white (W) subpixel 101 for implementing colors.

The frequency variable display apparatus according to an embodiment of the present disclosure can be implemented as an electroluminescent display apparatus. In this situation, a pixel circuit of the frequency variable display apparatus can include a light emitting device, a driving element, one or more switch elements, and a capacitor. The light emitting device can be implemented as an organic light emitting diode (OLED) or an inorganic light emitting diode. A driving current which allows the light emitting device to emit light can be adjusted based on a gate-source voltage of the driving element. Each of the driving element and the switch element can be implemented as a transistor. A semiconductor layer of the transistor can include amorphous silicon or polysilicon. A semiconductor layer of at least some of transistors can include oxide. The pixel circuit can be connected to a data line DL and a gate line GL. In FIG. 1, "D1 to D3" illustrated in a circle can be data lines, and "Gn-2 to Gn" can be gate lines. Also, each of the subpixels 101 can include the same pixel circuit configuration.

Touch sensors can be disposed on the display panel 100. The touch sensors can be arranged as an on-cell or add-on type on the screen AA of the display panel 100, or can be implemented as in-cell type touch sensors embedded in the pixel array. A touch input can be sensed through the touch sensors, or can be sensed through only pixels even without touch sensors.

A source driver 110 can convert the image data DATA, received from a timing controller 130, into gamma compensation voltages by using a digital-to-analog converter (DAC) to generate data voltages. The source driver 110 can supply the data voltages to the data lines DL. The data voltages can be supplied to the data lines DL and can be applied to gate electrodes of the driving elements through the switch elements of the subpixels 101. The source driver 110 can supply a reference voltage lines with a reference voltage Vref received from the power circuit 200. The reference voltage Vref can be supplied to the reference voltage lines and can be applied to a source electrode of the driving element through a switch element of each subpixel 101.

The source driver 110 can be implemented with one or more source drive integrated circuits (ICs). The source drive IC can be connected to the timing controller 130 through an internal interface circuit. The internal interface circuit can be implemented as an embedded clock point to point interface (EPI). The source drive IC can further include a touch driver. The touch driver can generate a touch sensor driving signal and can convert an electric charge variation of a touch sensor into touch raw data. The touch driver can transfer the touch raw data to a host system through a separate interface circuit. The separate interface circuit can be implemented as a serial peripheral interface (SPI), but is not limited thereto.

A gate driver 120 can be provided in a bezel region BZ which is outside a screen and does not display an image on the display panel 100. The gate driver 120 can sequentially supply a gate signal, synchronized with data voltages, to the gate lines GL according to control by the timing controller 130. The gate signal can simultaneously activate a pixel line into which a data voltage is charged. The gate driver 120 can output the gate signal by using one or more shift registers and can shift the gate signal. The gate signal can include one or more scan signals and an emission control signal. The gate signal can include a gate on voltage VON and a gate off voltage VOFF.

The timing controller 130 can receive video data DATA and a timing signal, synchronized with the video data DATA, from the host system. The timing signal can include a vertical synchronization signal Vsync, a horizontal synchronization signal Hsync, a clock signal DCLK, and a data enable signal DE. The vertical synchronization signal Vsync can define a vertical period (e.g., one frame). The horizontal synchronization signal Hsync can define a horizontal period. The data enable signal DE can define a time (e.g., a vertical active period) where the video data DATA is transferred in a vertical period. The other time, except the vertical active period, of the vertical period can be a vertical blank period. The data enable signal DE can swing in the vertical active period and may not swing in the vertical blank period.

The timing controller 130 can generate a source timing control signal DDC for controlling an operation timing of the source driver 110 and a gate timing control signal GDC for controlling an operation timing of the gate driver 120, based on the timing signal Vsync, Hsync, and DE received from the host system.

The host system can be one of a television (TV), a set-top box, a navigation system, a personal computer (PC), a home theater, an automotive display system, a mobile device, and a wearable device. In the mobile device and the wearable device, the source driver 110, the timing controller 130, and a level shifter 140 can be integrated into one drive IC.

The level shifter 140 can shift a logic voltage level of the gate timing control signal GDC, output from the timing controller 130, to a gate on voltage VON or a gate off voltage VOFF to supply to the gate driver 120. A low logic voltage of the gate timing control signal GDC can be shifted to the gate off voltage VOFF, and a high logic voltage of the gate timing control signal GDC can be shifted to the gate on voltage VON.

The source driver 110 (e.g., data driver) and the gate driver 120 can configure an image driving circuit. The image driving circuit can write the reference voltage Vref and data voltages, which are for displaying an input image in a vertical active period of one frame, in the subpixels 101 to implement active luminance in the subpixels 101. The data voltages can be written in the subpixels 101 through the data lines DL, and the reference voltage Vref can be written in the subpixels 101 through a reference voltage line.

The flicker compensation circuit 150 can apply a compensation voltage to at least one of the data line DL and the reference voltage line to implement blank luminance which is lower than active luminance, in a vertical blank period of one frame. When a frame frequency is changed, a length of a vertical active period can be fixed, but a length of a vertical blank period can be changed. The flicker compensation circuit 150 can implement the blank luminance which is lower than the active luminance, in the vertical blank period, and thus, can decrease a recognition luminance deviation between frames occurring in a rapid change condition of a frame frequency.

The flicker compensation circuit 150 can output a first compensation voltage to the data lines DL and/or can output a second compensation voltage to the reference voltage lines in the vertical blank period, to implement the blank luminance. Based on the first compensation voltage and/or the second compensation voltage, a gate-source voltage of the driving element can further decrease in the vertical blank period than the vertical active period, and thus, a current flowing in the driving element can be reduced.

The flicker compensation circuit 150 can be integrated into the power circuit 200.

The power circuit 200 can generate various source voltages for panel driving. The power circuit 200 can generate the gate on voltage VON and the gate off voltage VOFF for generating of the gate signal, generate a high level source voltage EVDD and a low level source voltage EVSS which are to be supplied to each subpixel 101, and generate the reference voltage Vref which is to be supplied to a reference voltage line.

Figure 2:
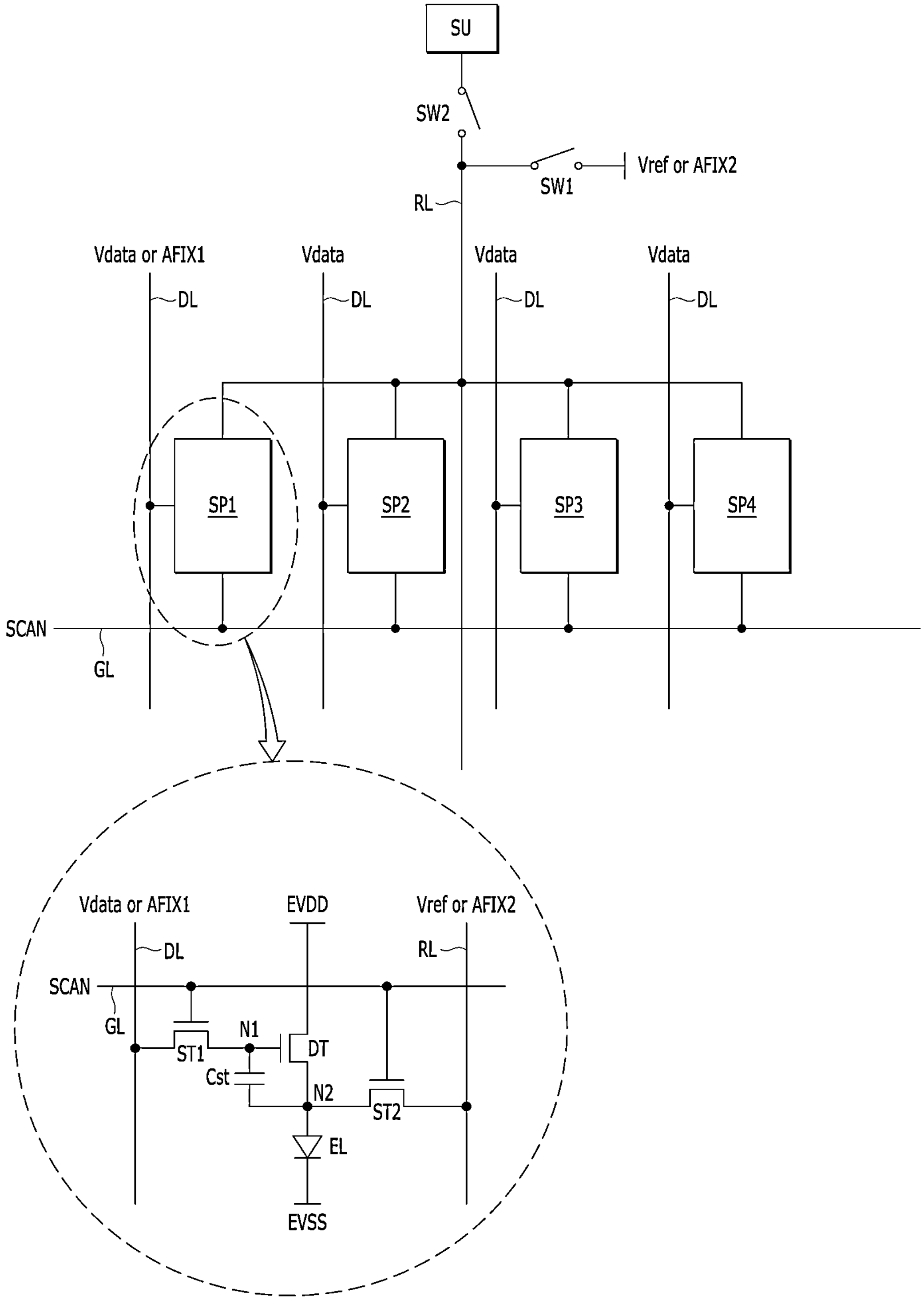
FIG. 2 is a diagram illustrating a connection configuration of one pixel according to an embodiment of the present disclosure.

FIG. 2 is a diagram illustrating a connection configuration of one pixel PXL according to an embodiment of the present disclosure.

Referring to FIG. 2, the one pixel PXL can include four subpixels SP1 to SP4 which share a reference voltage line RL. The four subpixels SP1 to SP4 can be R, G, B, and W subpixels for configuring the same pixel (e.g., of one pixel unit). Each of the subpixels SP1 to SP4 can include, for example, a light emitting device EL, a driving transistor DT, a storage capacitor Cst, a first switch transistor ST1, and a second switch transistor ST2.

The light emitting device EL can emit light with a driving current supplied from the driving transistor DT to implement luminance. An anode electrode of the light emitting device EL can be connected to a second node N2, and a cathode electrode thereof can be connected to an input terminal of a low level source voltage EVSS. In the same frame, the amount of current flowing in the light emitting device EL can be further reduced in a vertical blank period than in a vertical active period. This can be because a gate-source voltage of the driving transistor DT is further reduced by a coupling effect in the vertical blank period than in the vertical active period.

The driving transistor DT can generate the driving current based on the gate-source voltage thereof to supply to the light emitting device EL. A gate electrode of the driving transistor DT can be connected to a first node N1, a drain electrode thereof can be connected to an input terminal of a high level source voltage EVDD, and a source electrode thereof can be connected to the second node N2. In the same frame, the gate-source voltage of the driving transistor DT can be much more reduced in the vertical blank period than the in vertical active period. This can be because a compensation voltage is applied to one or more of a data line DL and a reference voltage line RL in the vertical blank period.

A gate electrode of the first switch transistor ST1 can be connected to a gate line GL. A first electrode of the first switch transistor ST1 can be connected to the data line DL, and a second electrode thereof can be connected to the first node N1.

A gate electrode of the second switch transistor ST2 can be connected to the gate line GL. A first electrode of the second switch transistor ST2 can be connected to the reference voltage line RL, and a second electrode thereof can be connected to the second node N2.

A first electrode of the storage capacitor Cst can be connected to the first node N1, and a second electrode thereof can be connected to the second node N2.

The first and second switch transistors ST1 and ST2 can be turned on based on a scan signal SCAN of a gate on voltage in the vertical active period, and thus, can connect the gate electrode of the driving transistor DT to the data line DL and can connect the source electrode of the driving transistor DT to the reference voltage line RL. Accordingly, a display programming operation for writing a data voltage Vdata and a reference voltage Vref can be performed. When the display programming operation is completed in the vertical active period, the first and second switch transistors ST1 and ST2 can be turned off based on a scan signal SCAN of a gate off voltage.

The first and second switch transistors ST1 and ST2 can be turned on based on the scan signal SCAN of the gate on voltage in a vertical back porch VBP (see FIG. 3) of the vertical blank period, and thus, can connect the gate electrode of the driving transistor DT to the data line DL and can connect the source electrode of the driving transistor DT to the reference voltage line RL. Accordingly, a sensing programming operation for a sensing process can be performed. When the sensing programming operation is completed in the vertical back porch VBP, the first and second switch transistors ST1 and ST2 can be turned off based on the scan signal SCAN of the gate off voltage.

The first and second switch transistors ST1 and ST2 can be turned on based on a scan signal SCAN of a gate-off control voltage in a vertical front porch VFP (see FIG. 3) of the vertical active period, and thus, can connect the gate electrode of the driving transistor DT to the data line DL and can connect the source electrode of the driving transistor DT to the reference voltage line RL. Accordingly, a flicker compensation programming operation for writing one or more of a first compensation voltage AFIX1 and a second compensation voltage AFIX2 can be performed. When the flicker compensation programming operation is completed in the vertical front porch, the first and second switch transistors ST1 and ST2 can be turned off based on the scan signal SCAN of the gate off voltage.

The first compensation voltage AFIX1 can be less than the data voltage Vdata charged into the first node N1 of the subpixel in the vertical active period. Also, the second compensation voltage AFIX2 can be greater than the reference voltage Vref charged into the second node N2 of the subpixel in the vertical active period.

A first switch SW1 and a second switch SW2 can be further connected to the reference voltage line RL. The first switch SW1 can connect an output terminal of the reference voltage Vref or an output terminal of the second compensation voltage AFIX2 to the reference voltage line RL. The second switch SW2 can connect a sensing circuit SU to the reference voltage line RL.

The first switch SW1 and the second switch SW2 can operate to be opposite to each other. That is, an electrical connection between the second switch SW2 and the reference voltage line RL can be broken or open while the first switch SW1 is being connected to the reference voltage line RL. On the other hand, an electrical connection between the first switch SW1 and the reference voltage line RL can be broken or open while the second switch SW2 is being connected to the reference voltage line RL.

A sensing operation of the sensing circuit SU can be enabled while the second switch SW2 is being connected to the reference voltage line RL. The sensing operation of the sensing circuit SU can be performed after the sensing programming operation is completed in the vertical back porch, and thus, an electrical characteristic change (e.g., a threshold voltage variation and an electron mobility change of the driving transistor) of each subpixel can be sensed.

Figure 3:
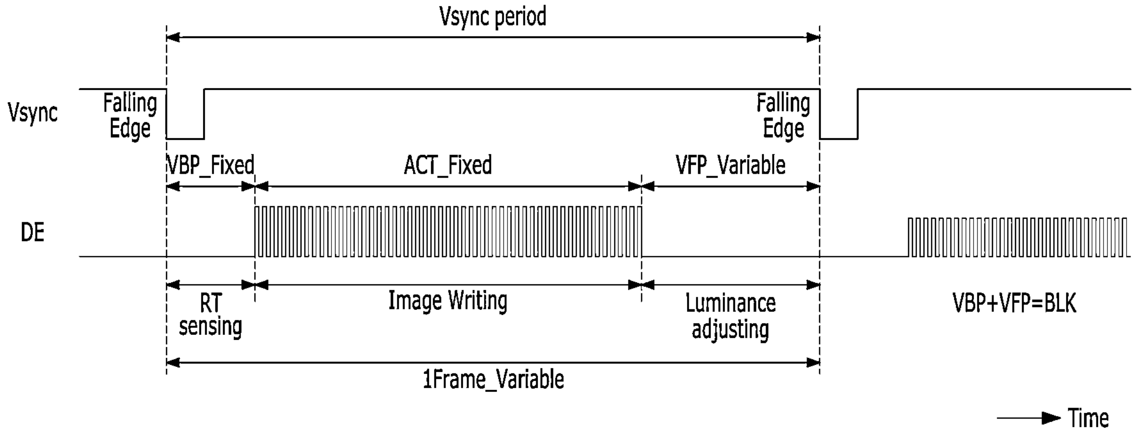
FIG. 3 is a diagram illustrating a vertical active period and a vertical blank period configuring one frame time according to an embodiment of the present disclosure.
Figure 4:
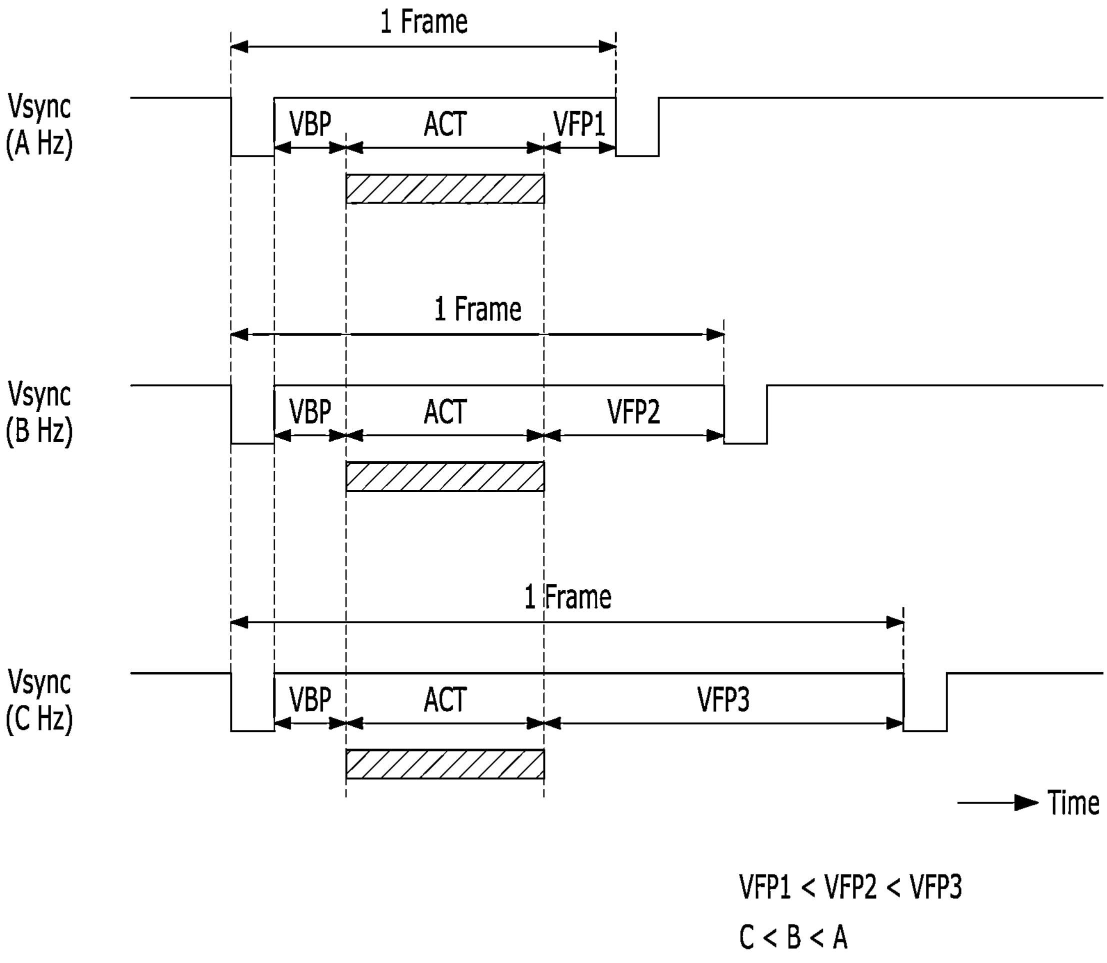
FIG. 4 is a diagram illustrating an example where a length of a vertical front porch included in a vertical blank period varies based on a level of a frame frequency according to an embodiment of the present disclosure.

FIG. 3 is a diagram illustrating a vertical active period and a vertical blank period configuring one frame time. FIG. 4 is a diagram illustrating an example where a length of a vertical front porch included in a vertical blank period varies based on a level of a frame frequency.

Referring to FIG. 3, one frame time (vertical period) can be defined by a vertical synchronization signal Vsync. The one frame time (vertical period) can be defined as a time interval between adjacent falling edges (or rising edges) of the vertical synchronization signal Vsync.

A vertical active period ACT and a vertical blank period BLK in the one frame time (vertical period) can be defined by a data enable signal DE. The vertical active period ACT can be a period where the data enable signal DE swings, and the vertical blank period BLK can be a period where the data enable signal DE does not swing (e.g., remains a logical low).

Vertical blank periods BLK can be divisionally arranged with the vertical active period ACT therebetween in the one frame. The vertical blank period BLK can include a vertical back porch VBP arranged previously to the vertical active period ACT and a vertical front porch VFP arranged next to the vertical active period ACT. The vertical back porch VBP can be a period at the beginning of the one frame before image data is displayed, and the vertical front porch VFP can be a period right at the end of the one frame that begins right after the image data is displayed. For example, the vertical back porch VBP can be a brief period at the beginning of a frame where no image data is transmitted, allowing the display hardware to reset and prepare for the incoming image data, and the vertical front porch VFP, occurring at the end of a frame, can provide a similar type of buffer period before the start of the next vertical sync pulse, to help ensure that the display device has enough time to complete the processing of the current frame before starting the next frame. The back and front porches can help ensure seamless transitions between frames and prevent visual artifacts from occurring or being noticeable by a viewer.

The frequency variable display apparatus according to embodiments of the present disclosure can have a VRR mode where a length of one frame varies or is adjustable. In the VRR mode, as in FIG. 4, a frame frequency can be changed to A Hz, B Hz, and C Hz. When the frame frequency is changed, one frame time can be changed to correspond thereto. At this time, each of a length of the vertical back porch VBP and a length of the vertical active period ACT can be fixed to a predetermined constant value, and a length of the vertical front porch VFP can be changed in proportional to a length of one frame time. In other words, the amount of time allotted during one frame for the vertical back porch VBP and the vertical active period ACT can remain the same, while the amount of time allotted for the vertical front porch VFP can be adjusted (e.g., increased or decreased) based on the driving frequency. For example, a length of the vertical front porch VFP can be VFP1, based on a frame frequency of A Hz (e.g., 240 Hz), a length of the vertical front porch VFP can be VFP2, based on a frame frequency of B Hz (e.g., 120 Hz), and a length of the vertical front porch VFP can be VFP3, based on a frame frequency of C Hz (e.g., 60 Hz). Here, when A>B>C, and VFP1<VFP2<VFP3. For example, as the driving frequency becomes lower (e.g., slower), then the length of the vertical front porch VFP can be increased while the time periods for the vertical back porch VBP and the vertical active period ACT remain the same or fixed.

In a vertical active period ACT having a fixed length, a display programming operation for writing an image can be performed.

In a vertical front porch VFP having a variable length, a flicker compensation operation for reducing luminance can be performed. The flicker compensation operation can be performed so that the luminance is reduced more as a length of the vertical front porch VFP increases. In other words, as the vertical front porch VFP becomes longer, then the luminance is reduced by a larger amount.

The sensing programming operation and the sensing operation described above can be performed in the vertical back porch VBP having a fixed length. In the VRR mode, because a real-time (RT) sensing operation is performed in the vertical back porch VBP having the fixed length, a sensing line compensation algorithm can be applied in real time without an error. The sensing line compensation algorithm can be technology which differentially applies a compensation gain for luminance restoration, based on a position of a pixel line where a sensing operation is performed, and thus, increases image quality. For example, when the sensing operation is performed in a blank period where a length is changed based on a frame frequency, it can be difficult to apply the sensing line compensation algorithm in real time. This can be because a length of a blank period should be more reflected in a compensation gain, but the length of the blank period may not be known until the blank period ends. That is, this can be because the length of the blank period may not be known at a time at which the sensing line compensation algorithm is executed.

Figure 5:
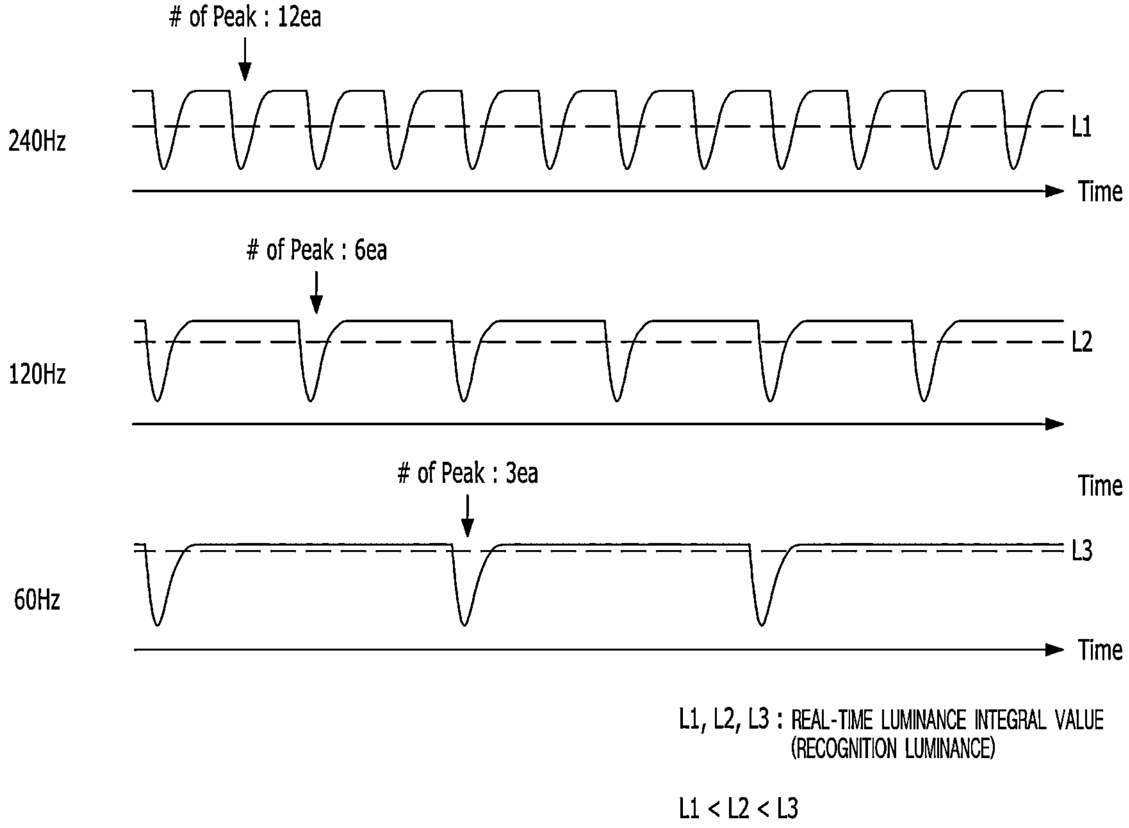
FIG. 5 is a diagram illustrating an example where recognition luminance is changed based on a level of a frame frequency according to an embodiment of the present disclosure.
Figure 6:
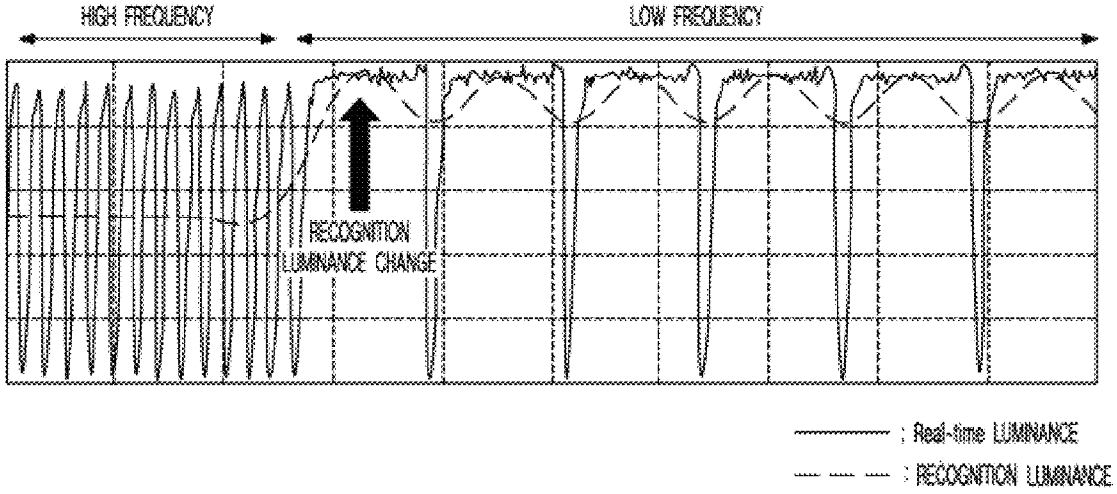
FIG. 6 is a diagram illustrating a recognition luminance deviation occurring in a rapid change condition of a frame frequency.
Figure 7:
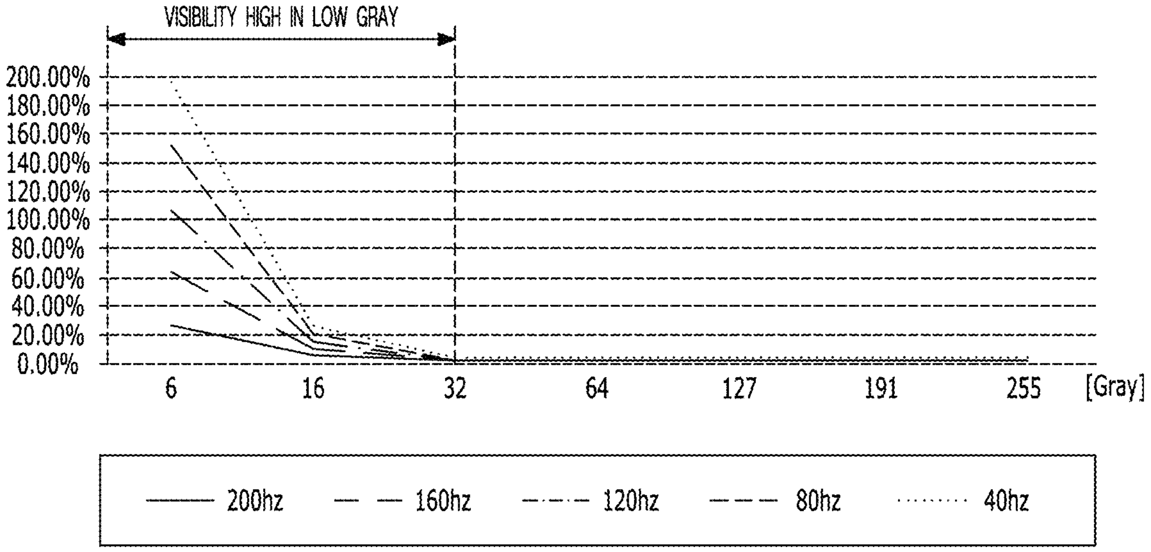
FIGS. 7 and 8 are diagrams illustrating an example where the visibility of a recognition luminance deviation occurring in a rapid change condition of a frame frequency is higher in a high gray level than a low gray level.
Figure 8:
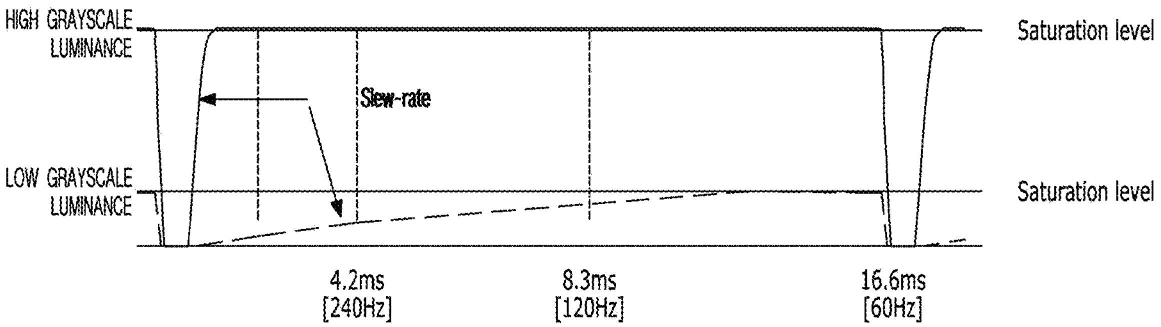

FIG. 5 is a diagram illustrating an example where recognition luminance is changed based on a level of a frame frequency. FIG. 6 is a diagram illustrating a recognition luminance deviation occurring in a rapid change condition of a frame frequency. Also, FIGS. 7 and 8 are diagrams illustrating an example where the visibility of a recognition luminance deviation occurring in a rapid change condition of a frame frequency is higher in a high gray level than a low gray level.

Peak low points of FIGS. 5 and 6 can be points at which a display programming operation is performed. An emission operation can be performed after the display programming operation is performed. The emission operation can stop while the display programming operation is being performed.

The display programming operation and the emission operation can be successively performed in one frame. The number of display programming operations can increase as the number of frame arrangements in a predetermined time increases, namely, a frame frequency increases, and thus, recognition luminance can be reduced. For example, the number of display programming operations in a predetermined time in a frame frequency of 240 Hz can be twelve, the number of display programming operations in a predetermined time in a frame frequency of 120 Hz can be six, and the number of display programming operations in a predetermined time in a frame frequency of 60 Hz can be three. As a result, a real-time luminance integral value (e.g., recognition luminance) of a frame frequency of 240 Hz can be L1, a real-time luminance integral value (e.g., recognition luminance) of a frame frequency of 120 Hz can be L2 which is higher than L1, and a real-time luminance integral value (e.g., recognition luminance) of a frame frequency of 60 Hz can be L3 which is higher than L2. In other words, the screen may appear brighter to a viewer when it is being driven at a low driving frequency, such as 60 Hz, because there are fewer display programming operations, and the screen may appear dimmer or darker when being driven at a high driving frequency, such as 240 Hz. Thus, if the display device quickly changes from a low driving frequency to a high driving frequency or vice versa, there may be a change in luminance that is noticeable to the viewer which can impair the viewing experience.

As described above, when it is assumed that a gray level of a display image is constant, recognition luminance can be relatively higher in a situation, where a frame frequency is a low frequency, than a situation where the frame frequency is a high frequency. Accordingly, a luminance deviation caused by a change in recognition luminance can occur when the frame frequency is changed from a high frequency to a low frequency.

A frequency-based luminance deviation, as in FIGS. 7 and 8, can be relatively higher recognized in a low grayscale period than a high grayscale period. In a situation where a time taken until reaching an active luminance saturation level immediately after programming is defined as a luminance slew rate, a luminance slew rate of a high grayscale image can be relatively higher than a luminance slew rate of a low grayscale image. Accordingly, a recognition luminance deviation caused by a change in frequency may not be largely issued in a high grayscale image, but can be more clearly recognized when displaying a low grayscale image.

Figure 9:
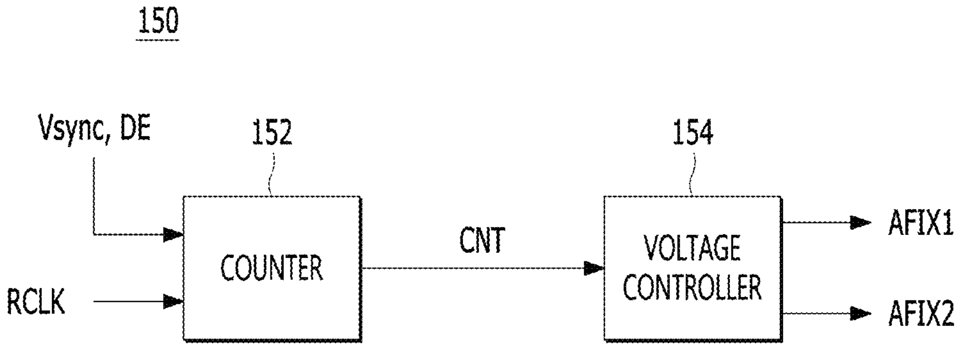
FIG. 9 is a diagram illustrating a configuration of a flicker compensation circuit according to an embodiment of the present disclosure.
Figure 10:
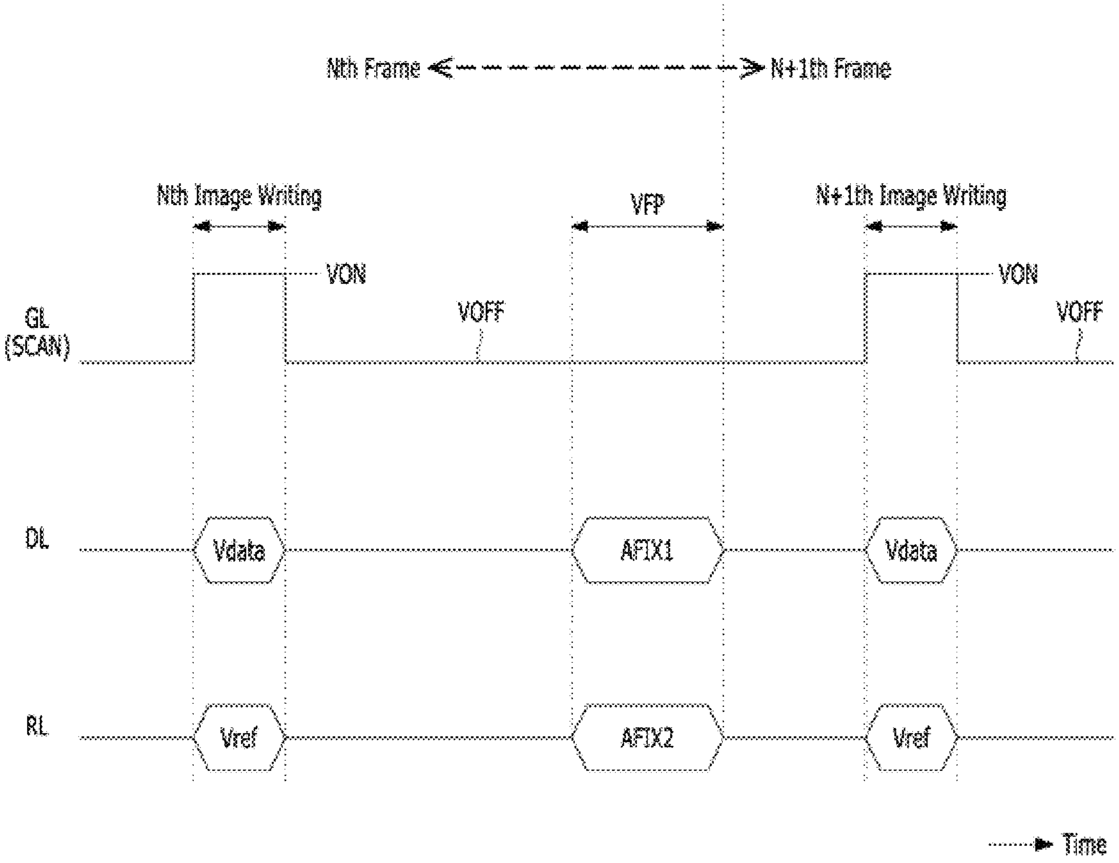
FIGS. 10 and 11 are driving timing diagrams for describing a luminance control operation of a flicker compensation circuit according to an embodiment of the present disclosure.
Figure 11:
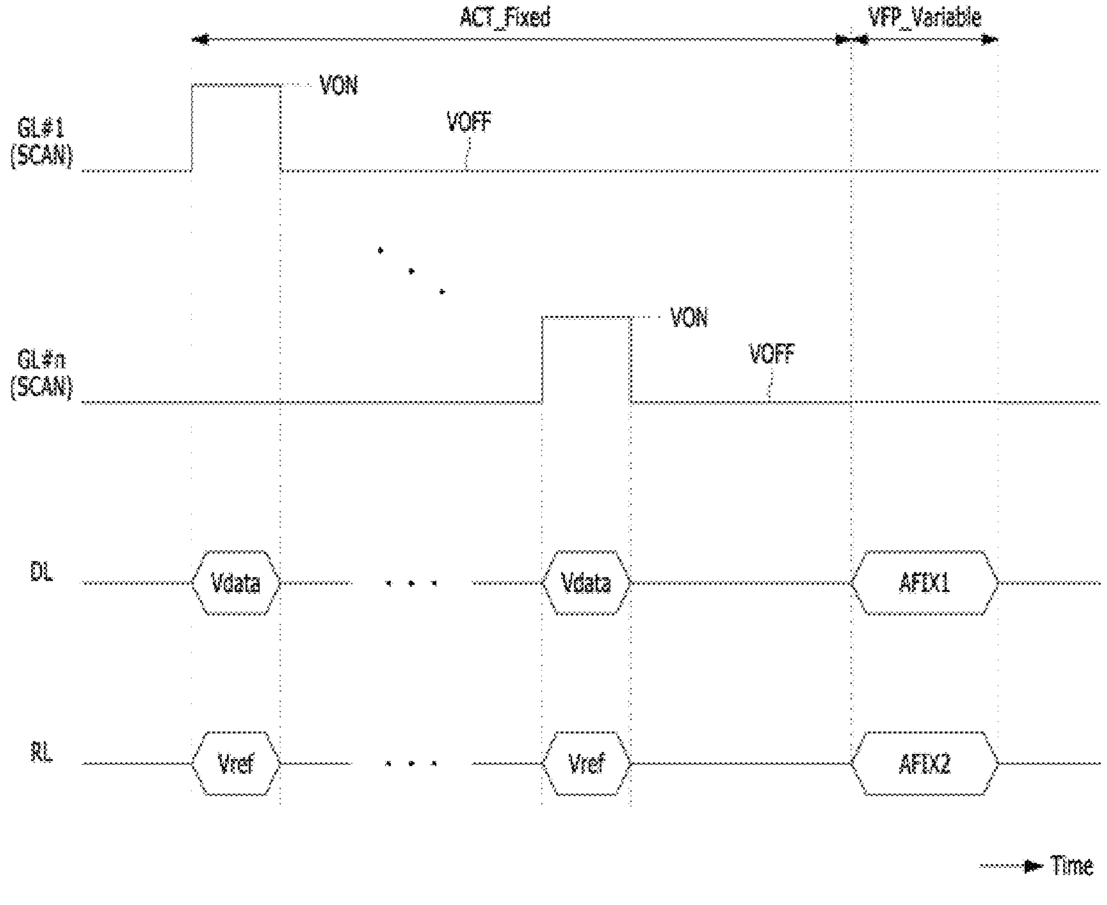
Figure 12:
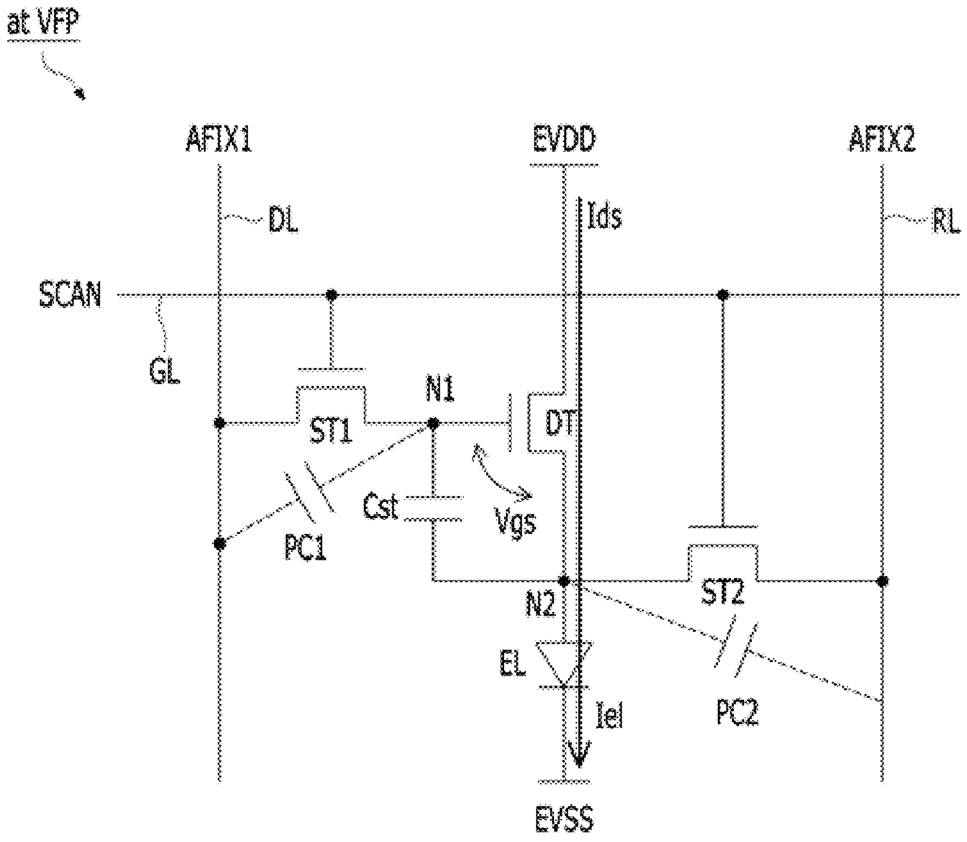
FIG. 12 is a diagram for describing an operation of one subpixel in a vertical front porch according to an embodiment of the present disclosure.

FIG. 9 is a diagram illustrating a configuration of a flicker compensation circuit 150 according to an embodiment of the present disclosure. FIGS. 10 and 11 are driving timing diagrams for describing a luminance control operation of the flicker compensation circuit 150 according to an embodiment of the present disclosure. FIG. 12 is a diagram for describing an operation of one subpixel in a vertical front porch according to an embodiment of the present disclosure.

Referring to FIGS. 9 to 12, the flicker compensation circuit 150 according to the present embodiment can decrease an electric potential of a data line DL to a first compensation voltage AFIX1 and/or can increase an electric potential of a reference voltage line RL to a second compensation voltage AFIX2, in a vertical front porch VFP. The data line DL and a gate electrode of a driving transistor DT can be coupled to each other through a parasitic capacitor PC1, and the reference voltage line RL and a source electrode of the driving transistor DT can be coupled to each other through a parasitic capacitor PC2. Accordingly, a gate-source voltage Vgs of the driving transistor DT and the amount of driving current Ids can be reduced in the vertical front porch VFP, thereby providing a combined contribution to decrease luminance through a light emitting device EL.

The flicker compensation circuit 150 can control a level of the first compensation voltage AFIX1 and a level of the second compensation voltage AFIX2 in proportional to a length of the vertical front porch VFP. To this end, the flicker compensation circuit 150 can include a counter 152 and a voltage controller 154.

A length of the vertical front porch VFP defined by a vertical synchronization signal Vsync and a data enable signal DE can vary based on a frame frequency. The counter 152 can count a length of the vertical front porch VFP with a reference clock RCLK to supply a real-time count value CNT to the voltage controller 154.

The voltage controller 154 can control a level of the first compensation voltage AFIX1 and a level of the second compensation voltage AFIX2, based on the real-time count value CNT corresponding to a length of the vertical front porch VFP.

Figure 13:
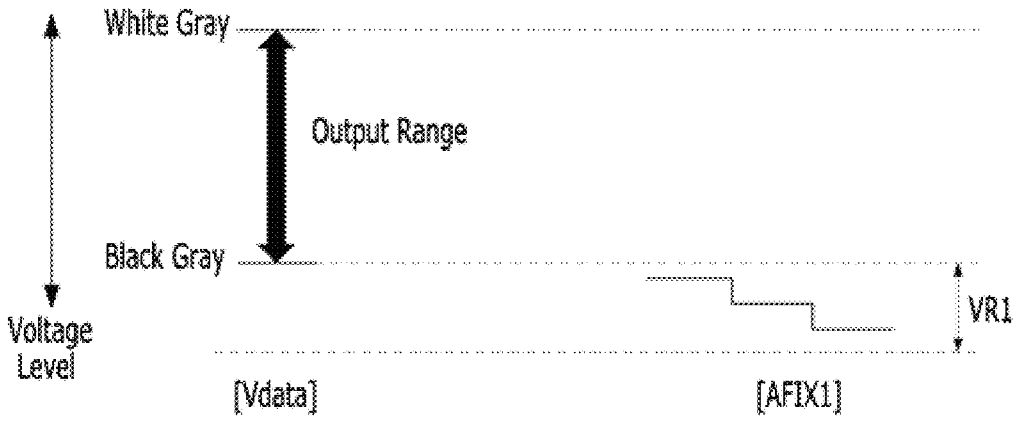
FIG. 13 is a diagram illustrating an example where an electric potential of a data line is a first compensation voltage which is less than a lower limit output value of a data voltage, in a vertical front porch according to an embodiment of the present disclosure.
Figure 14:
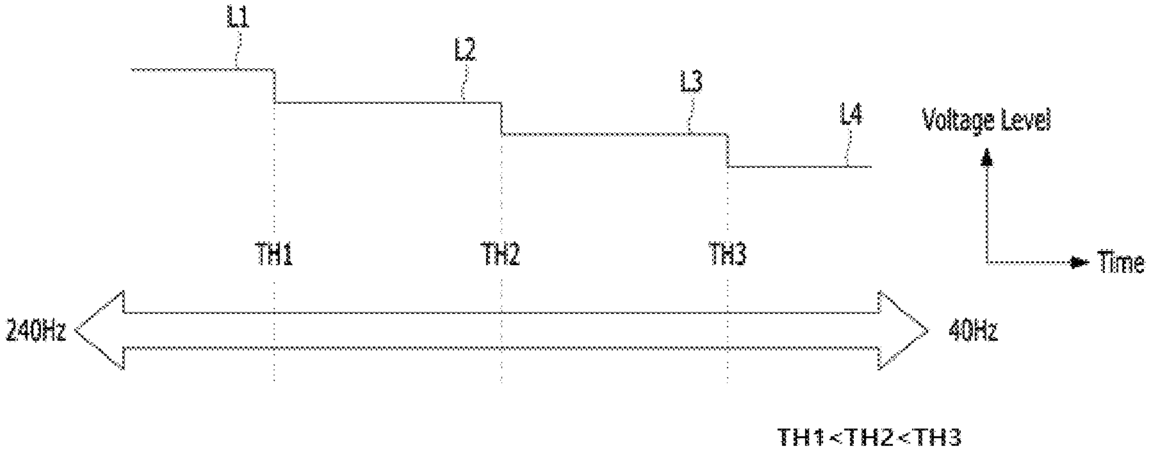
FIG. 14 is a diagram illustrating an example where a level of a first compensation voltage decreases stage-by-stage within a first voltage control range in real time in proportion to a length of a vertical front porch according to an embodiment of the present disclosure.

FIG. 13 is a diagram illustrating an example where an electric potential of a data line is a first compensation voltage which is less than a lower limit output value of a data voltage, in a vertical front porch. FIG. 14 is a diagram illustrating an example where a level of a first compensation voltage gradually decreases stage-by-stage within a first voltage control range in real time in proportion to a length of a vertical front porch.

Referring to FIG. 13, the flicker compensation circuit 150 can vary a level of a first compensation voltage AFIX1 within a first voltage control range VR1, based on a length of a vertical front porch VFP. In this situation, the first voltage control range VR1 can be within a voltage range which is less than a lower limit output value of a data voltage Vdata corresponding to a black gray level. Also, an upper limit output value of the data voltage Vdata can correspond to a white gray level.

By using the flicker compensation circuit 150, as in FIG. 14, a level of the first compensation voltage AFIX1 can be gradually decreased, stage-by-stage, within the first voltage control range VR1 in real time in proportion to a length of the vertical front porch VFP.

The flicker compensation circuit 150 can previously store a plurality of count threshold values TH1 to TH3 having different magnitudes, which respectively correspond to a plurality of frame frequencies, and can down-control stage-by-stage a level of the first compensation voltage AFIX1 through a sequential comparison operation between the plurality of count threshold values TH1 to TH3 and a real-time count value of a length of the vertical front porch VFP.

Figure 15:
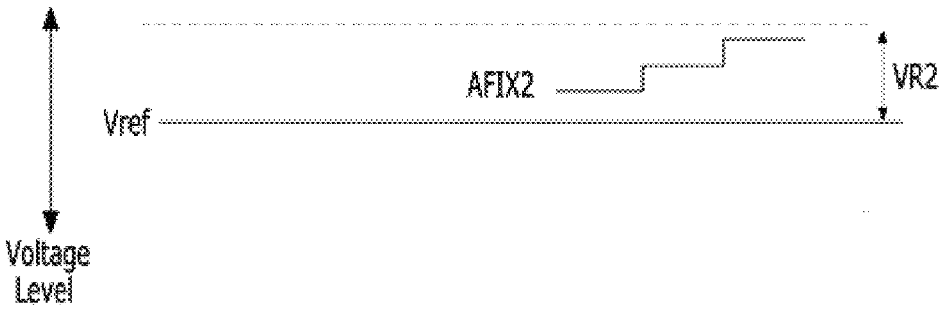
FIG. 15 is a diagram illustrating an example where an electric potential of a reference voltage line is a second compensation voltage which is greater than a reference voltage, in a vertical front porch according to an embodiment of the present disclosure.
Figure 16:
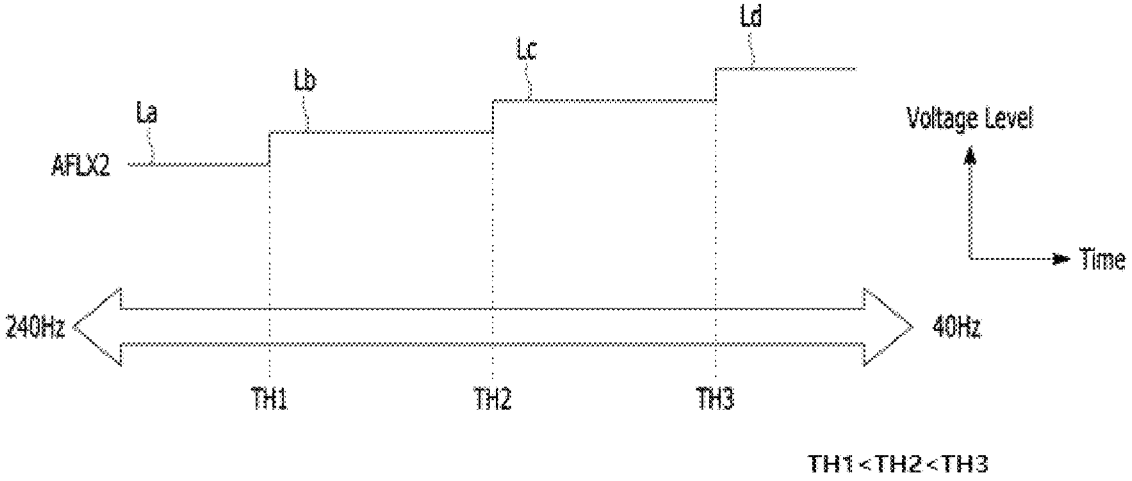
FIG. 16 is a diagram illustrating an example where a level of a second compensation voltage increases stage-by-stage within a second voltage control range in real time in proportion to a length of a vertical front porch according to an embodiment of the present disclosure.

FIG. 15 is a diagram illustrating an example where an electric potential of a reference voltage line is a second compensation voltage which is greater than a reference voltage, in a vertical front porch. FIG. 16 is a diagram illustrating an example where a level of a second compensation voltage gradually increases, stage-by-stage, within a second voltage control range in real time in proportion to a length of a vertical front porch.

Referring to FIG. 15, the flicker compensation circuit 150 can vary a level of a second compensation voltage AFIX2 within a second voltage control range VR2, based on a length of a vertical front porch VFP. In this situation, the second voltage control range VR2 can be within a voltage range which is greater than a reference voltage Vref.

By using the flicker compensation circuit 150, as in FIG. 16, a level of the second compensation voltage AFIX2 can gradually increase stage-by-stage within the second voltage control range VR2 in proportion to a length of the vertical front porch VFP.

The flicker compensation circuit 150 can previously store a plurality of count threshold values TH1 to TH3 having different magnitudes, which respectively correspond to a plurality of frame frequencies, and can up-control stage-by-stage a level of the second compensation voltage AFIX2 through a sequential comparison operation between the plurality of count threshold values TH1 to TH3 and a real-time count value of a length of the vertical front porch VFP. For example, as the driving frequency is changed from a high driving frequency to a low driving frequency, the vertical front porch VFP becomes longer and the first compensation voltage AFIX1 applied to the data line during the vertical front porch VFP can be gradually decreased and the second compensation voltage AFIX2 applied to reference line can be gradually increased, and vice versa, in order to smooth out any deviations in luminance as the driving frequency is adjusted.

Figure 17:
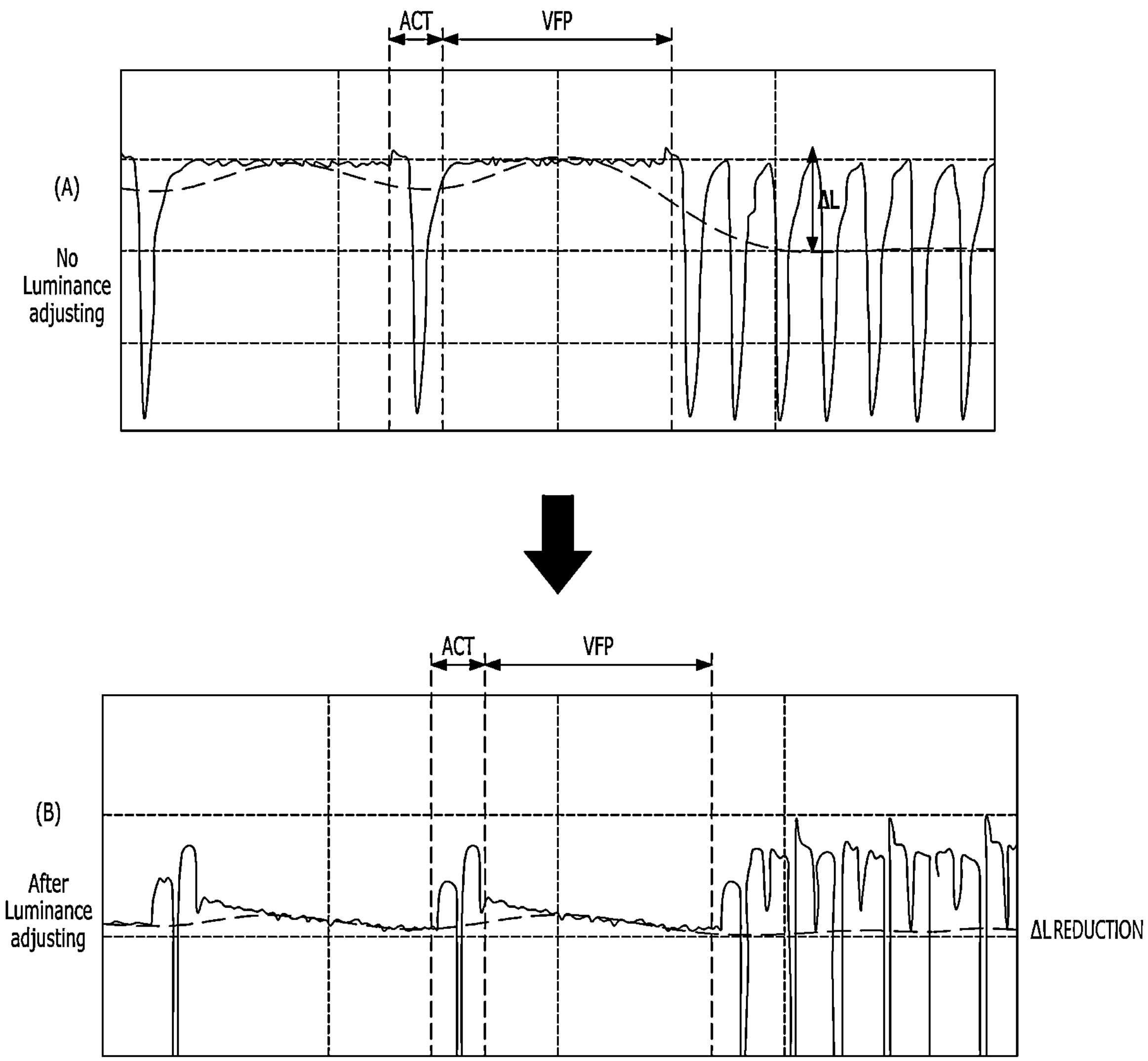
FIG. 17 is a diagram illustrating a relative magnitude of a recognition luminance deviation in a situation where a luminance control operation is implemented in a vertical front porch and otherwise according to an embodiment of the present disclosure.

FIG. 17 is a diagram illustrating a relative magnitude of a recognition luminance deviation in a situation where a luminance control operation is implemented in a vertical front porch and a situation where the luminance control operation is not implemented.

Referring to FIG. 17, in (A) a conventional method where a luminance control operation is not implemented in a vertical front porch VFP in performing a VRR operation, when a frame frequency is rapidly changed from a low-speed frame to a high-speed frame or vice versa, a flicker phenomenon caused by a luminance deviation can be recognized by a user, which can impair the user's viewing experience. However, in (B) showing the present embodiment, because a luminance control operation is implemented in the vertical front porch VFP in performing the VRR operation, a recognition luminance deviation can be reduced despite a rapid change condition of a frame frequency, and a flicker phenomenon may not be recognized by a user and image quality can be improved even when switching between different driving frequencies.

Figure 18:
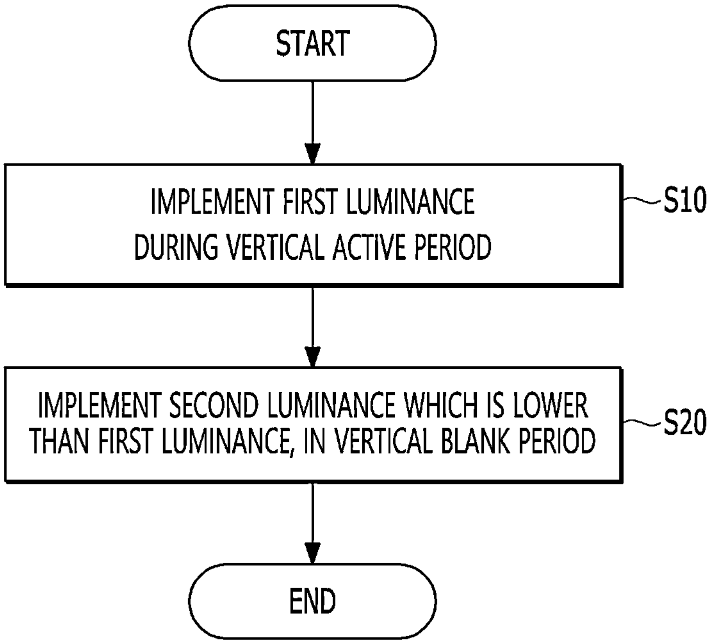
FIG. 18 is a diagram illustrating a flicker compensation method of a frequency variable display apparatus according to an embodiment of the present disclosure.

FIG. 18 is a diagram illustrating a flicker compensation method of a frequency variable display apparatus according to the present embodiment.

Referring to FIG. 18, the flicker compensation method of the frequency variable display apparatus according to the present embodiment can write, in each subpixel, a data voltage through a data line and a reference voltage through a reference voltage line in a vertical active period of one frame to implement active luminance (S10).

Subsequently, the flicker compensation method of the frequency variable display apparatus according to the present embodiment can apply a compensation voltage to at least one of the data line and the reference voltage line in a vertical blank period of the one frame to implement blank luminance which is lower than the active luminance (S20).

The present embodiment can realize the following effect.

The present embodiment can decrease a recognition luminance deviation occurring in a rapid change condition of a frame frequency, thereby considerably improving display quality.

The effects according to the present disclosure are not limited to the above examples, and other various effects can be included in the specification.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A display apparatus comprising:

a display panel including a plurality of subpixels;

an image driving circuit configured to write, in each of the plurality of subpixels, a data voltage through a data line and a reference voltage through a reference voltage line during a vertical active period of one frame to implement active luminance; and a flicker compensation circuit configured to apply a compensation voltage to at least one of the data line and the reference voltage line in a vertical blank period of the one frame to implement blank luminance, the blank luminance being lower than the active luminance, wherein the vertical blank period includes a vertical front porch period between an end of the vertical active period of the one frame and a start of a vertical synchronization signal, and wherein the flicker compensation circuit is further configured to apply the compensation voltage to the data line during the vertical front porch period of the one frame.

2. The display apparatus of claim 1, wherein the vertical blank period includes a vertical back porch period before the vertical active period in the one frame, wherein a length of the vertical back porch period is fixed to a constant value regardless of a length variation of the one frame, and wherein a length of the vertical front porch period varies in proportion to a length of the one frame.

3. The display apparatus of claim 2, wherein the flicker compensation circuit is further configured to apply the compensation voltage to the reference voltage line in the vertical front porch of the one frame.

4. The display apparatus of claim 1, wherein an electric potential of the data line in the vertical active period is the data voltage, wherein the electric potential of the data line in the vertical front porch period is changed from the data voltage to a first compensation voltage that is lower than the data voltage, and wherein a gate-source voltage of a driving transistor included in each subpixel is lower in the vertical front porch period than in the vertical active period.

5. The display apparatus of claim 4, wherein a level of the first compensation voltage varies within a first voltage control range, based on the length of the vertical front porch period, and wherein the first voltage control range is within a voltage range that is lower than a lower limit output value of the data voltage.

6. The display apparatus of claim 5, wherein a level of the first compensation voltage decreases stage-by-stage within the first voltage control range in real time in proportion to the length of the vertical front porch period.

7. The display apparatus of claim 3, wherein an electric potential of the reference voltage line in the vertical active period is the reference voltage, wherein an electric potential of the reference voltage line in the vertical front porch period is changed from the reference voltage to a second compensation voltage that is greater than the reference voltage, and wherein a gate-source voltage of a driving transistor included in each subpixel is lower in the vertical front porch period than in the vertical active period.

8. The display apparatus of claim 7, wherein a level of the second compensation voltage varies within a second voltage control range, based on the length of the vertical front porch period, and wherein the second voltage control range is within a voltage range that is greater than the reference voltage.

9. The display apparatus of claim 8, wherein a level of the second compensation voltage increases stage-by-stage within the second voltage control range in real time in proportion to the length of the vertical front porch period.

10. The display apparatus of claim 2, wherein the flicker compensation circuit includes a counter configured to count a number of horizontal synchronization signals during the vertical front porch period to generate a count value.

11. The display apparatus of claim 10, wherein the flicker compensation circuit is further configured to determine a level of the compensation voltage based on the count value generated by the counter.

12. The display apparatus of claim 11, wherein the flicker compensation circuit is further configured to adjust the level of the compensation voltage such that a difference between the blank luminance and the active luminance increases as the count value increases.

13. The display apparatus of claim 1, wherein each of the plurality of subpixels includes a driving transistor configured to control a driving current, wherein the data line is electrically connected to a gate electrode of the driving transistor, and wherein the reference voltage line is electrically connected to a source electrode of the driving transistor.

14. The display apparatus of claim 13, wherein the compensation voltage is configured to control a gate-source voltage of the driving transistor during the vertical front porch period to be lower than a gate-source voltage of the driving transistor during the vertical active period.

15. The display apparatus of claim 1, wherein the vertical active period corresponds to a period in which a data enable signal supplied to the image driving circuit is active, and wherein the vertical blank period corresponds to a period in which the data enable signal is inactive.

16. The display apparatus of claim 1, wherein the image driving circuit is configured to drive the display panel at a variable frame frequency, and wherein the flicker compensation circuit is configured to increase a magnitude of the compensation voltage as the variable frame frequency decreases.

* * * * *